Figure 1:
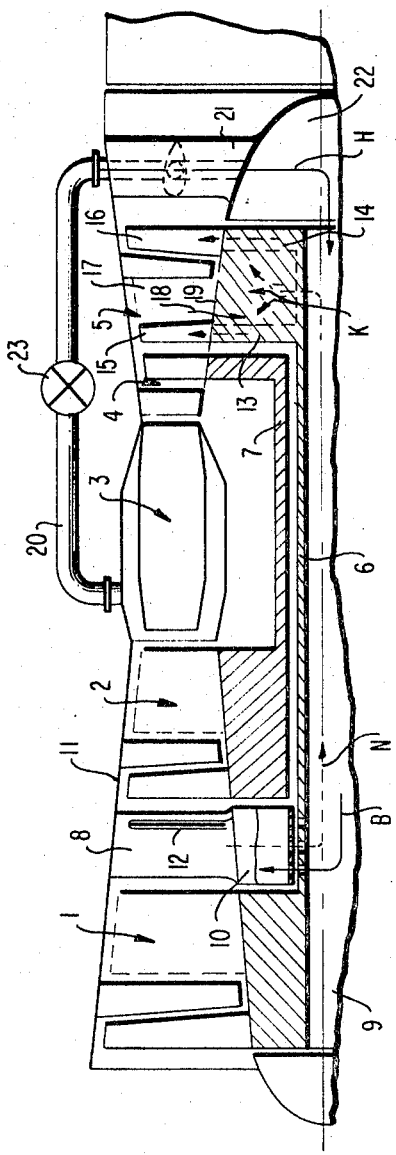

United States Patent [19]
Kohler

[11] 3,751,909
[45] Aug. 14, 1973

[54] TURBOJET AERO ENGINES HAVING MEANS FOR ENGINE COMPONENT COOLING AND COMPRESSOR CONTROL

[75] Inventor: Gottfried Kohler, Friedrichshafen, Germany

[73] Assignee: MTV Munich GmbH, Munich, Germany

[22] Filed: Aug. 26, 1971

[21] Appl. No.: 175,210

[30] Foreign Application Priority Data
Aug. 27, 1970 Germany.................. P 20 42 478.6

[52] U.S. Cl.............. 60/39.17, 415/115, 415/117, 415/144, 415/DIG. 1, 60/39.66
[51] Int. Cl. ....................... F04d 27/00, F02c 7/12
[58] Field of Search...................... 60/39.29, 39.66, 60/39.17; 415/DIG. 1, 144, 115, 117

[56] References Cited
UNITED STATES PATENTS
3,107,690  10/1963  Pope et al.......................... 60/39.29
2,825,532  3/1958   Kadosch et al. ..................... 415/115
3,572,960  3/1971   McBride ........................ 415/DIG. 1
3,527,054  9/1970   Hemsworth........................ 60/39.66
2,830,754  4/1958   Stalker................................ 415/144
2,314,058  3/1943   Stalker.......................... 415/DIG. 1
3,420,502  1/1969   Howald.............................. 415/115

Primary Examiner—Carlton R. Croyle
Assistant Examiner—Robert E. Garrett
Attorney—Craig, Antonelli & Hill

[57] ABSTRACT

This invention relates to gas turbine engines, and, more particularly, to multishaft turbojet aero engines having a plurality of compressors and turbines, in which air is bled from one or several compressors in the engine for cooling engine components and for providing a seal between the rotary and stationary assemblies of the several rotor systems, and in which means are additionally provided for compressor control.

19 Claims, 4 Drawing Figures

Patented Aug. 14, 1973

3,751,909

2 Sheets-Sheet 1

INVENTOR
GOTTFRIED KOHLER

BY Craig, Antonelli & Hill

ATTORNEYS

TURBOJET AERO ENGINES HAVING MEANS FOR ENGINE COMPONENT COOLING AND COMPRESSOR CONTROL

Advances in turbojet aero-engine design are continually escalating the compression ratios in use, with compression being achieved essentially by means of multistage axial-flow compressors whose unsatisfactory performance in off-design situations is being combatted in various ways. Typical disclosed improvements employ several stages of variable compressor stator vanes or resort to twin-spool arrangements in which the compression load is shared between two mechanically mutually independent compressors.

It is nevertheless evident that even in a twin-spool engine having two, mechanically mutually independent compressors, conditions in the high pressure compressor are conducive to surge when the engine is operating at speeds from starting to idling. This may be attributed to the fact that in the lower speed range the airflow from the low pressure into the high pressure compressor is deficient for the speed attained by the latter.

Another consideration is that the high pressure compressor blades in a turbojet engine are commonly designed around airflow requirements at rated engine speed, but that the optimum flow is not fully attained during engine starting and run-up.

Finally, stalling at the upper sides of the high pressure compressor blades can lead to the breakdown of the airflow and the notorious stall phenomenon in that compressor. This holds true especially for turbojet engines which incorporate straight support vanes in the path of flow from the low pressure to the high pressure compressor, such vanes tending to promote breadaway from the upper sides of the compressor blades downstream.

A likely remedy to correct these deficiencies is making the high pressure compressor inlet guide vanes variable, with the one object of constricting the flow areas to adapt them to the diminished low pressure compressor discharge during starting and run-up.

Another objective would be to vary the incidence of the air impinging on the downstream blades to minimize the threat of surging in the noted fashion.

Of these two expedients the former will naturally not remedy the deficient airflow through the high pressure compressor to avoid the risk of compressor surging, for the low pressure compressor discharge is inherently low during engine starting and run-up. The latter remedy may well be suited for averting surging at the upper sides of the high pressure compressor blades downstream of the inlet guide vanes; but variable inlet vanes involve complex engineering provisions that are not compatible with the simplicity demanded of compressor control mechanisms.

In turbojet engine work, compressor air is commonly diverted at one or more bleed points for cooling the interior components that will yield the proper type of air for the particular job. The practice is, for instance, to use air under compressor discharge pressure to cool turbine discs and blades and prevent the entry of hot turbine gases into the areas between turbine discs, whereas a smaller amount of pressure bled at a suitable low pressure bleed point along the compressor is considered sufficient for cooling bearing compartments and shafts. A further consideration in the selection of bleed air is its concomitant task of maintaining sufficient excess pressure on bearing compartments to preclude the exit of lubricant over the entire engine operating range. With the twin-spool turbojet arrangement the preferred practice is to tap low pressure compressor cooling air at a point located between the low pressure and the high pressure compressor.

While the high pressure compressor cooling air, owing to its elevated pressure level, can be exhausted into the turbine duct, it is the prevailing practice in current turbojet work to discharge the low pressure compressor cooling air from the engine duct into atmosphere, the pressure in the exhaust duct aft of the low pressure turbine normally being too high to permit otherwise. Low pressure compressor cooling air is then not exploited for thrust.

Likewise, in engines using the new design concepts where low pressure compressor air is tapped at a point between the two compressors, the cooling system operating on air from the low pressure compressor cannot empty into the engine exhause pipe owing to the low pressure ratio of the forward compressor in the lower speed range, which runs to somewhere near idling. As a result, low pressure compressor cooling air is bled overboard and lost in terms of thrust rather than allow it to pass into the turbine duct, where it must be expected that the hot turbine gases and the damage resulting therefrom will invade the low pressure compressor cooling air system.

It is a broad object of the present invention to provide a gas turbine engine which eliminates the noted deficiencies especially when they occur in the engine run-up range from starting to idling speed.

It is a particular object of this invention to provide a gas turbine engine, and, more particularly, a turbojet aero engine incorporating a means suitably arranged between a low discharge pressure first compressor and a high discharge pressure second compressor for imparting aerodynamic angular momentum or whirl to the air entering the second compressor, and in which use can be made of high pressure air tapped at the outlet from or a point near the ultimate stages of the second compressor for producing this inlet whirl.

A further aspect of the present invention includes exhausting the high pressure air used to produce inlet whirl through the ports which serve for tapping low pressure cooling air.

In further development of the inventive concept the ports can be near the trailing edges of stationary, hollow support vanes located between the first and the second compressor.

In an alternative aspect of the present invention the ports can be associated with the inlet guide vanes of the second compressor.

In a further aspect of this invention the ports can be slot-shaped.

If it is not practicable or desirable to utilize support or inlet guide vanes for exhausting whirl air or tapping low pressure cooling air, a further feature of the present invention provides ports in the shape of one or more slots in the inner or outer circumference of the inlet casing of the second compressor.

It is a further object of this invention to provide at least one bypass line connecting with the outlet from or a point near the ultimate stages of the second compressor and leading through a hollow support vane type of turbine outlet vane into the turbine exhaust cone which is in communication with the tapping ports through a hollow shaft in the low pressure rotor system.

The present invention further provides an adjusting means in the bypass line for varying or interrupting the air flow.

Figure 3:
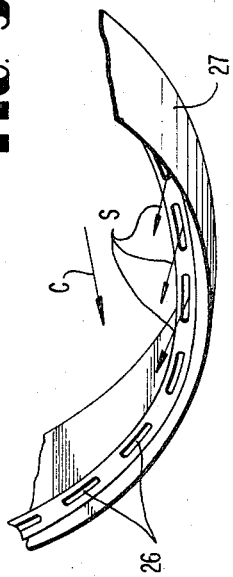
Figure 2A:
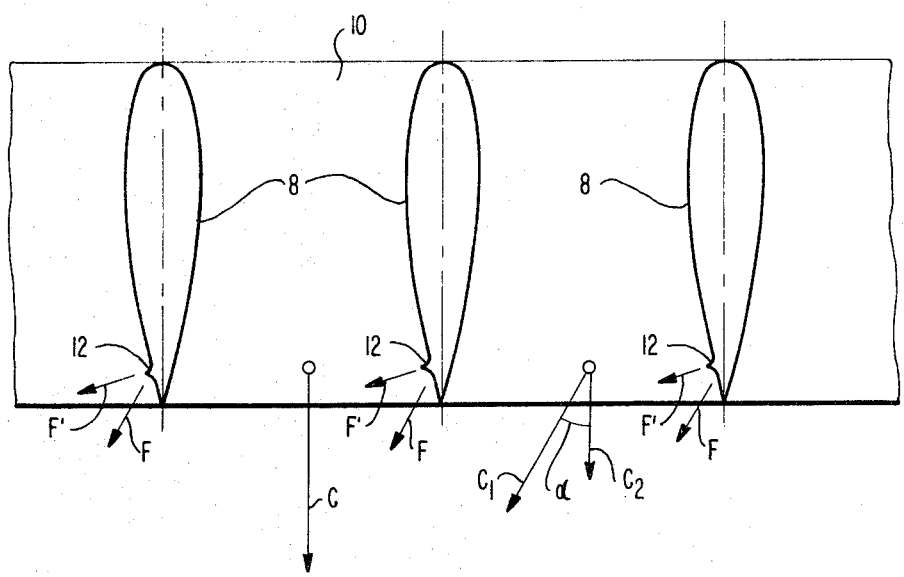
Figure 2B:
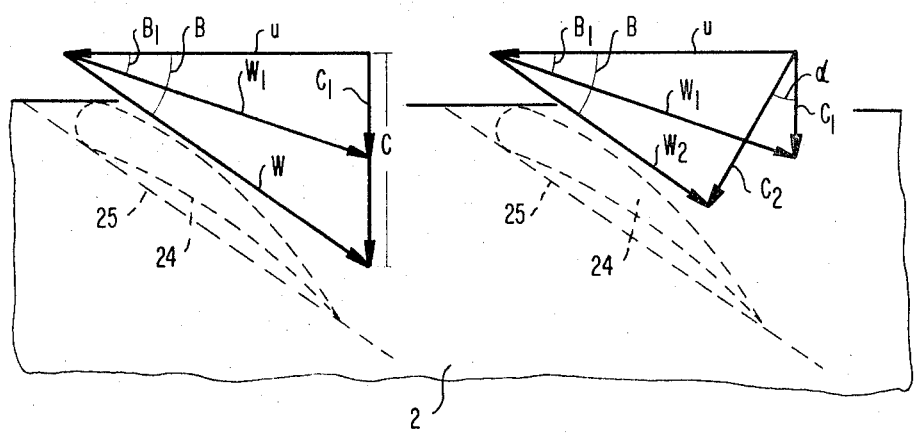

Further objects and advantages of the present invention will become apparent from the accompanying drawings in which FIG. 1 is a schematic view of a longitudinal section of the upper half of a twin-spool turbojet engine;

FIGS. 2a and 2b are diagrammatic views illustrating the operation of this invention when use is made of straight support vanes between a first and a second compressor in the engine assembled in accordance with FIG. 1; and FIG. 3 is a perspective view of a compressor casing section illustrating the invention employing means other than shown in the embodiment of FIG. 1.

Reference is now made to FIG. 1 in particular which illustrates a twin-spool turbojet engine assembled in accordance with this invention. A low pressure compressor 1 is shown, followed from left to right by a high pressure compressor 2, a combustion chamber 3, a high pressure turbine 4 and a low pressure turbine 5. Low pressure compressor 1 and low pressure turbine 5 are interconnected through a common shaft 6. High pressure compressor 2 and high pressure turbine 4 are interconnected through a hollow shaft 7 over shaft 6.

Arranged between low pressure compressor 1 and high pressure compressor 2 is a plurality of straight hollow support vanes 8 (FIG. 2a). Vanes 8 can be equally spaced around turbojet centerline 9 and between a stationary section 10 adjacent to shaft 6 and compressor casing 11. Vanes 8 of this embodiment each incorporate near their trailing edges a longitudinally extending slot 12 (FIG. 2a) which can be used to discharge high pressure air in the direction indicated by arrows F' in FIG. 2, giving the trailing edges of vanes 8 an aerodynamic camber 9 (direction of arrow F), or to tap low pressure cooling air. In this manner, when operating conditions are normal, this low pressure cooling air flows along slots 12 into support vanes 8 and through stationary section 10 into hollow shaft 6 (direction of arrow N). From shaft 6 and continuing in the direction of arrows K, this low pressure cooling air can optionally be used for cooling turbine discs 13 and 14 or blades 15 and 16 thereon of low pressure turbine 5 and the turbine bearings (not shown).

Another practical use of low pressure cooling air in accordance with this invention is in the prevention of ingress of hot gases from turbine duct 17, conceivably in the direction of arrow 18, between a stationary section 19 of low pressure turbine 5 and turbine disc 13, into the low pressure cooling air system. The low pressure cooling air thus likewise serves a sealing function in the normal operating condition.

When the low pressure cooling air has completed its sealing and cooling tasks, as exemplified in this embodiment, it can be allowed to escape, under normal operating conditions, into turbine duct 17 through perhaps the open ends of blades 15 and 16.

Given a certain off-design situation, especially in the turbojet engine range from starting to idling speed, the airflow discharged by low pressure compressor 1 into high pressure compressor 2 for further compression may be too low to suit the speed attained by high pressure compressor 2. It must further be conceded that high pressure compressor 2 is selectively bladed for a certain airflow commensurate with rated speed under optimum operating conditions. These are the reasons for having to expect surging conditions in high pressure compressor 2 during run-up from starting to idling speed on the one hand, and leakage of hot gases from turbine duct 17 into the low pressure cooling air system (e.g. along arrow 18) on the other.

To obviate these problems the present invention provides an examplified means comprising at least one bypass line 20 which connects with the outlet from high pressure compressor 2 and leads through hollow turbine outlet vane 21 into hollow turbine exhaust cone 22 which communicates with hollow shaft 6.

In the noted critical range of turbojet engine operation an adjusting means 23 in bypass line 20 can open line 20 to allow high pressure air diverted from high pressure compressor 2 to flow along arrow H into hollow shaft 6 to take up such sealing or cooling functions as may be served in the rated condition by low pressure cooling air in low pressure cooling turbine 5, ensuring that in the critical range heated gases are nevertheless prevented from escaping from, say, turbine duct 17 in the direction of arrow 18. Another portion of the air drawn from high pressure compressor 2 flows through shaft 6 along arrow B into stationary hollow section 10, from there into support vanes 8 between the compressors 1 and 2 to issue from the vanes through longitudinal slots 12 in the direction of arrow F' (FIG. 2a).

FIG. 2b is helpful in understanding the action of the air after it is exhausted. Component c in the drawings is assumed to represent in direction and magnitude an airstream generated under normal operating conditions and issuing between two support vanes 8. FIG. 2b (lower left) illustrates that the angle of attack of design-flow oriented rotor blades 24 of high pressure compressor 2 downstream of support vanes 8 is such that chord 25 runs parallel to velocity component $w$.

Now if the critical operating condition between starting and idling speed of the turbojet engine causes the flow between two support vanes 8 to diminish by, say, one half ($c_1$ on FIG. 2a), this will make the angle of attack $\beta_1$ (FIG. 2b) too small and the resultant vector of velocity component $w_1$ will create a considerable resistance of blades 24 to the flow, causing stalling at the upper side of the blade and hence surging in high pressure compressor 2.

Blowing additional high pressure air from support vanes 8 in the direction F will augment component $q$ to a value $c_2$ and deflect it at an angle $\alpha$ (exemplified here at 30°) so that the original angle of attack $\beta$ in the velocity triangle (FIG. 2b) is restored and that chord 25, as is in harmony with the normal condition sought, runs parallel to now slightly reduced velocity component $w_2$. It is, then, by inclining component $w_2$ at such an angle $\beta$ that the risk of stalling at the upper side of blade 24 is avoided.

The flow of high pressure air exhausted through longitudinal slots 12 in support vanes 8 is variable via adjusting means 23 in bypass line 20 (FIG. 1) to provide exactly the amount of pressure needed to relieve the surge condition in high pressure compressor 2. When the turbojet engine has traversed the critical range from starting to idling speed, adjusting means 23 is used to interrupt the flow of high pressure air.

If the engine does not incorporate support vanes 8 as shown in FIGS. 1 and 2 between low pressure compressor 1 and high pressure compressor 2, ports can conceivably be provided in the trailing edges of stationary inlet guide vanes of the high pressure compressor 2 for exhausting high pressure air and also for tapping low pressure cooling air.

The air bleed provisions described above are not inevitably tied exclusively to the use of support or inlet guide vanes in high pressure compressor 2. The same action can likewise be gained by providing ports or slots in the inner or outer circumference at the inlet end of high pressure compressor 2 for tapping low pressure cooling air and, if desirable, exhausting high pressure air. This is illustrated in FIG. 3 showing a section 27 of a compressor inlet casing, with parts broken away for clarity of representation, incorporating transverse slots 26 in the inner circumference of the casing for tapping low pressure cooling air and exhausting high pressure air, where the direction of high pressure exhaust air can be the same as that marked F' in FIG. 2a, but is given an extra inward slant (arrow S). The direction of normal airflow is that marked with a c in FIG. 2a.

What is claimed is:

1. A multi-shaft gas turbine engine comprising: low pressure compressor means, low pressure turbine means, high pressure compressor means, high pressure turbine means, said high pressure compressor means being arranged in a casing means downstream of said low pressure compressor means for accepting discharge flow from said low pressure compressor means,
   port means opening into said casing means at a position intermediate said low pressure compressor means and said high pressure compressor means,
   first line means communicating said port means with cooling and sealing spaces of said engine,
   second line means communicating said port means with discharge flow from said high pressure compressor means,
   and control valve means for closing said second line means during a first range of engine operating conditions such that said port means and said first line means supply portions of the discharge flow from said low pressure compressor means as cooling and sealing air to said cooling and sealing spaces and for opening said second line means during a second range of engine operating conditions such that said second line means supplies portions of the discharge flow from said high pressure compressor means to said port means to produce aerodynamic swirl of the air supplied to the high pressure compressor means which prevents surging of said high pressure compressor means.

2. A gas turbine engine according to claim 1, wherein said first range corresponds to normal engine operation with said low pressure compressor means supplying sufficient discharge flow to efficiently supply said high pressure compressor means, and wherein said second range corresponds to engine starting conditions with said low pressure compressor means supplying a smaller discharge flow to said high pressure compressor means than during said normal engine operation.

3. A gas turbine engine according to claim 2, wherein at least one stationary support guide vane is positioned in said casing means intermediate said low pressure compressor means and said high pressure compressor means for guiding the discharge flow from said low pressure compressor means into rotatable blades of said high pressure compressor means, wherein said at least one guide vane contains a hollow space therein, wherein said port means extend from said hollow space to an exterior surface of said at least one guide vane, and wherein both of said first and second line means communicate with said hollow space.

4. A gas turbine engine according to claim 2, wherein said first and second line means are connected with one another such that said second line means supplies portions of the discharge flow from said high pressure compressor means as cooling and sealing air to said cooling and sealing spaces when said second line means is open.

5. A gas turbine engine according to claim 4, wherein at least one stationary support guide vane is positioned in said casing means intermediate said low pressure compressor means and said high pressure compressor means for guiding the discharge flow from said low pressure compressor means into rotatable blades of said high pressure compressor means, wherein said at least one guide vane contains a hollow space therein, wherein said port means extend from said hollow space to an exterior surface of said at least one guide vane, and wherein both of said first and second line means communicate with said hollow space.

6. A gas turbine engine according to claim 2, wherein a combustion chamber is arranged in said casing means downstream of said high pressure compressor means for accepting portions of the discharge flow from said high pressure compressor means, and wherein said second line means includes a by-pass line having one end opening into the discharge flow of the high pressure compressor means at a position upstream of said combustion chamber and the other end opening into at least one hollow turbine support vane means arranged downstream of said combustion chamber.

7. A gas turbine engine according to claim 6, wherein the high and low pressure turbine means are serially arranged downstream of said combustion chamber, wherein said at least one hollow turbine support vane means is arranged downstream of the low pressure turbine means, and wherein said second line means further includes a hollow turbine exhaust cone attached to said at least one hollow turbine support vane means and a hollow rotor shaft which drivingly connects said low pressure compressor means with said low pressure turbine means.

8. A gas turbine engine according to claim 7, wherein said control valve means is arranged in said by-pass line.

9. A gas turbine engine according to claim 8, wherein said first line means includes portions of said hollow rotor shaft, which last-mentioned portions also form part of said second line means.

10. A gas turbine engine according to claim 7, wherein at least one stationary support guide vane is positioned in said casing means intermediate said low pressure compressor means and said high pressure compressor means for guiding the discharge flow from said low pressure compressor means into rotatable blades of said high pressure compressor means, wherein said at least one guide vane contains a hollow space therein, wherein said port means extend from said hollow space to an exterior surface of said at least one guide vane, and wherein both of said first and second line means communicate with said hollow space.

11. A gas turbine engine according to claim 10, wherein said first and second line means are connected with one another such that said second line means supplies portions of the discharge flow from said high pressure compressor means as cooling and sealing air to said cooling and sealing spaces when said second line means is open.

12. A gas turbine engine according to claim 11, wherein said first line means includes portions of said hollow rotor shaft, which last-mentioned portions also form part of said second line means.

13. A gas turbine engine according to claim 3, wherein said port means are constructed as slots arranged adjacent trailing edges of said at least one guide vane.

14. A gas turbine engine according to claim 13, wherein said slots are configured to reduce the magnitude of the resultant velocity of air supplied to blades of said high pressure compressor means as well as to reorient said resultant velocity so as to be parallel to the chord of respective ones of said blades when high pressure compressor discharge flow is supplied to said slots by said second line means.

15. A gas turbine engine according to claim 12, wherein said port means are constructed as slots arranged adjacent trailing edges of said at least one guide vane.

16. A gas turbine engine according to claim 15, wherein said slots are configured to reduce the magnitude of the resultant velocity of air supplied to blades of said high pressure compressor means as well as to reorient said resultant velocity so as to be parallel to the chord of respective ones of said blades when high pressure compressor discharge flow is supplied to said slots by said second line means.

17. A gas turbine engine according to claim 2, wherein said port means are constructed as slots arranged in wall portions of said casing means.

18. A gas turbine engine according to claim 17, wherein said slots are configured to reduce the magnitude of the resultant velocity of air supplied to blades of said high pressure compressor means as well as to reorient said resultant velocity so as to be parallel to the chord of respective ones of said blades when high pressure compressor discharge flow is supplied to said slots by said second line means.

19. A gas turbine engine according to claim 2, wherein said sealing and cooling spaces include spaces in turbine blades of said low pressure turbine means.

* * * * *